(12) United States Patent
Saon et al.

(10) Patent No.: US 11,151,996 B2
(45) Date of Patent: Oct. 19, 2021

(54) VOCAL RECOGNITION USING GENERALLY AVAILABLE SPEECH-TO-TEXT SYSTEMS AND USER-DEFINED VOCAL TRAINING

(71) Applicant: International Business Machines Corporation, Armonk, NY (US)

(72) Inventors: George A. Saon, Stamford, CT (US); Nicolò Sgobba, Brno (CZ); Antonello Izzi, Brno (CZ); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 16/385,630

(22) Filed: Apr. 16, 2019

(65) Prior Publication Data

US 2020/0335100 A1    Oct. 22, 2020

(51) Int. Cl.
*G10L 15/20*    (2006.01)
*G10L 15/22*    (2006.01)
(Continued)

(52) U.S. Cl.
CPC ............ *G10L 15/22* (2013.01); *G10L 15/063* (2013.01); *G10L 15/07* (2013.01); *G10L 15/26* (2013.01);
(Continued)

(58) Field of Classification Search
CPC ......... G10L 15/20; G10L 15/22; G10L 15/00; G10L 15/01; G10L 15/06; G10L 15/063; G10L 15/065; G10L 15/07; G10L 15/075; G10L 15/18; G10L 15/26; G10L 15/30; G10L 2015/22; G10L 2015/00; G10L 2015/06; G10L 2015/063; G10L 2015/0631; G10L 2015/0635; G10L 2015/0636; G10L 2015/0638; G10L 2015/221; G10L 2015/223; G10L 2015/225228; G10L 2015/225; G10L 2015/228
(Continued)

(56) References Cited

U.S. PATENT DOCUMENTS 8,886,540 B2    11/2014  Cerra et al.
9,472,186 B1 *  10/2016  Clark ................... G10L 15/063
(Continued)

OTHER PUBLICATIONS

Jay Huang, "Simplifying Hard-Coding Using a Macro Call," https://www.lexjansen.com/pharmasug/2005/CodersCorner/cc28.pdf, last modified May 25th, 2005, accessed Feb. 9, 2019 4:04:12 PM EST.

*Primary Examiner* — Qi Han
(74) *Attorney, Agent, or Firm* — Patterson + Sheridan, LLP

(57) ABSTRACT

Techniques for augmenting the output of generally available speech-to-text systems using local profiles are presented. An example method includes receiving an audio recording of a natural language command. The received audio recording of the natural language command is transmitted to a speech-to-text system, and a text string generated from the audio recording is received from the speech-to-text system. The text string is corrected based on a local profile mapping incorrectly transcribed words from the speech-to-text system to corrected words. A function in a software application is invoked based on the corrected text string.

20 Claims, 4 Drawing Sheets

(51) Int. Cl.
*G10L 15/07* (2013.01)
*G10L 15/06* (2013.01)
*G10L 15/26* (2006.01)

(52) U.S. Cl.
CPC ............... *G10L 2015/0633* (2013.01); *G10L 2015/223* (2013.01)

(58) Field of Classification Search
USPC .......... 704/44, 233, 236, 243, 250, 257, 244
See application file for complete search history.

(56) References Cited

U.S. PATENT DOCUMENTS

| | | | |
|---|---|---|---|
| 9,595,005 | B1 | 3/2017 | Puzicha et al. |
| 10,388,274 | B1* | 8/2019 | Hoffmeister ...... G06F 16/24522 |
| 2008/0154612 | A1 | 6/2008 | Evermann et al. |
| 2019/0362252 | A1* | 11/2019 | Miller .................... G06N 3/006 |

* cited by examiner

VOCAL RECOGNITION USING GENERALLY AVAILABLE SPEECH-TO-TEXT SYSTEMS AND USER-DEFINED VOCAL TRAINING

BACKGROUND

The present invention relates to speech-to-text systems that convert audio recordings to text strings, and more specifically, to increasing the accuracy of speech-to-text systems.

Generally available speech-to-text systems transform spoken text to computer-recognizable strings using various natural language processing (NLP) techniques. These generally available systems may be configured to transform spoken text in various languages to computer-recognizable strings. For each language, these systems may be trained over a general data set based on native speakers of the language. For example, a system trained to recognize speech patterns from American English speakers may be trained on a data set including recordings of speakers with a general American English accent or inflection; a system trained to recognize speech patterns from British English speakers may be trained on a data set including recordings of speakers using Received Pronunciation; and so on. However, users of a computer program using a generally available speech-to-text system may not speak using the accent or inflection used to train the speech-to-text system. For example, a user with a strong regional accent (e.g., for American English speakers, a strong New York, Boston, or southern accent; for British English speakers, a strong Mancunian, Birmingham, or Scottish accent; etc.) or a user who is a non-native speaker of a language may pronounce words differently from the speakers whose recordings were used to train the generally available speech-to-text system. Because of these differences, generally available speech-to-text systems may erroneously transcribe recorded speech from some users.

To account for variation in the ways in which users of generally available speech-to-text systems speak (e.g., variations in accent, inflection, pronunciation of words, etc.), additional utterances (or recorded audio clips of a user's speech) may be added to a training data set used to train these speech-to-text systems. Adding some variations to a training data set used to train a generally available speech-to-text system may improve the accuracy of these speech-to-text systems in parsing recorded speech into a text string usable by a computer system. Personalization of a generally available speech-to-text system, however, may not account for individual variations in speech.

SUMMARY

One embodiment of the present disclosure provides a method for invoking an action on a computing device using natural language commands. The method generally includes receiving an audio recording of a natural language command. The received audio recording of the natural language command is transmitted to a speech-to-text system, and a text string generated from the audio recording is received from the speech-to-text system. The text string is corrected based on a local profile mapping incorrectly transcribed words from the speech-to-text system to corrected words. A function in a software application is invoked based on the corrected text string.

Another embodiment of the present disclosure provides a system having a processor and memory. The memory generally has instructions stored thereon which, when executed by the processor, performs an operation for invoking an action on a computing device using natural language commands. The operation generally includes receiving an audio recording of a natural language command. The received audio recording of the natural language command is transmitted to a speech-to-text system, and a text string generated from the audio recording is received from the speech-to-text system. The text string is corrected based on a local profile mapping incorrectly transcribed words from the speech-to-text system to corrected words. A function in a software application is invoked based on the corrected text string.

Still another embodiment of the present disclosure provides a computer-readable medium having instructions stored thereon which, when executed by one or more processors, performs an operation for invoking an action on a computing device using natural language commands. The operation generally includes receiving an audio recording of a natural language command. The received audio recording of the natural language command is transmitted to a speech-to-text system, and a text string generated from the audio recording is received from the speech-to-text system. The text string is corrected based on a local profile mapping incorrectly transcribed words from the speech-to-text system to corrected words. A function in a software application is invoked based on the corrected text string.

DETAILED DESCRIPTION

Embodiments presented herein describe techniques for generating local profiles for different users of a generally available speech-to-text system that may be used in conjunction with the output of various generally available speech-to-text systems to increase the accuracy of automated speech transcription systems. The local profiles may be generated based on user feedback mapping the output of a generally available speech-to-text system to a user-provided string representing the actual utterance provided by the user to the generally available speech-to-text system. When a user invokes a speech-to-text operation on a client device, the client device transmits a recording of the user's utterance to a generally available speech-to-text system for analysis and receives a text string from the generally available speech-to-text system. The client system can use the local profile associated with the user to determine whether the received text string accurately represents the user's utterance and make any corrections to the received text string. The corrected text string may then be used to invoke one or more requested operations on the client device or remote system.

By augmenting a generally available speech-to-text system with local profiles associated with various users and environments in which a user invokes speech-to-text conversion, embodiments presented herein may increase the accuracy of transcriptions of speech to text strings. The local profiles may take into account individual user speech patterns, which may differ from general speech patterns or the speech patterns used to train a generally available speech-to-text system, to identify words in a received utterance that are transcribed incorrectly by the generally available speech-to-text system and correct the identified words. Further, multiple local profiles may be generated for a user based on an environment in which the user invokes speech transcription functions of a generally available speech-to-text system (e.g., to differentiate between use of the speech-to-text system in home and work environments), and user profiles for different users may be downloaded onto a client device to allow for multiple users of a client device (e.g., members of a family who use the same client device) to use a personalized speech-to-text system. Further, refinement of text strings received from a generally available speech-to-text system may not be restricted to specific client devices or speech-to-text systems, which allows for the profiles to be moved from client devices and used with a plurality of generally available speech-to-text systems.

Figure 1:
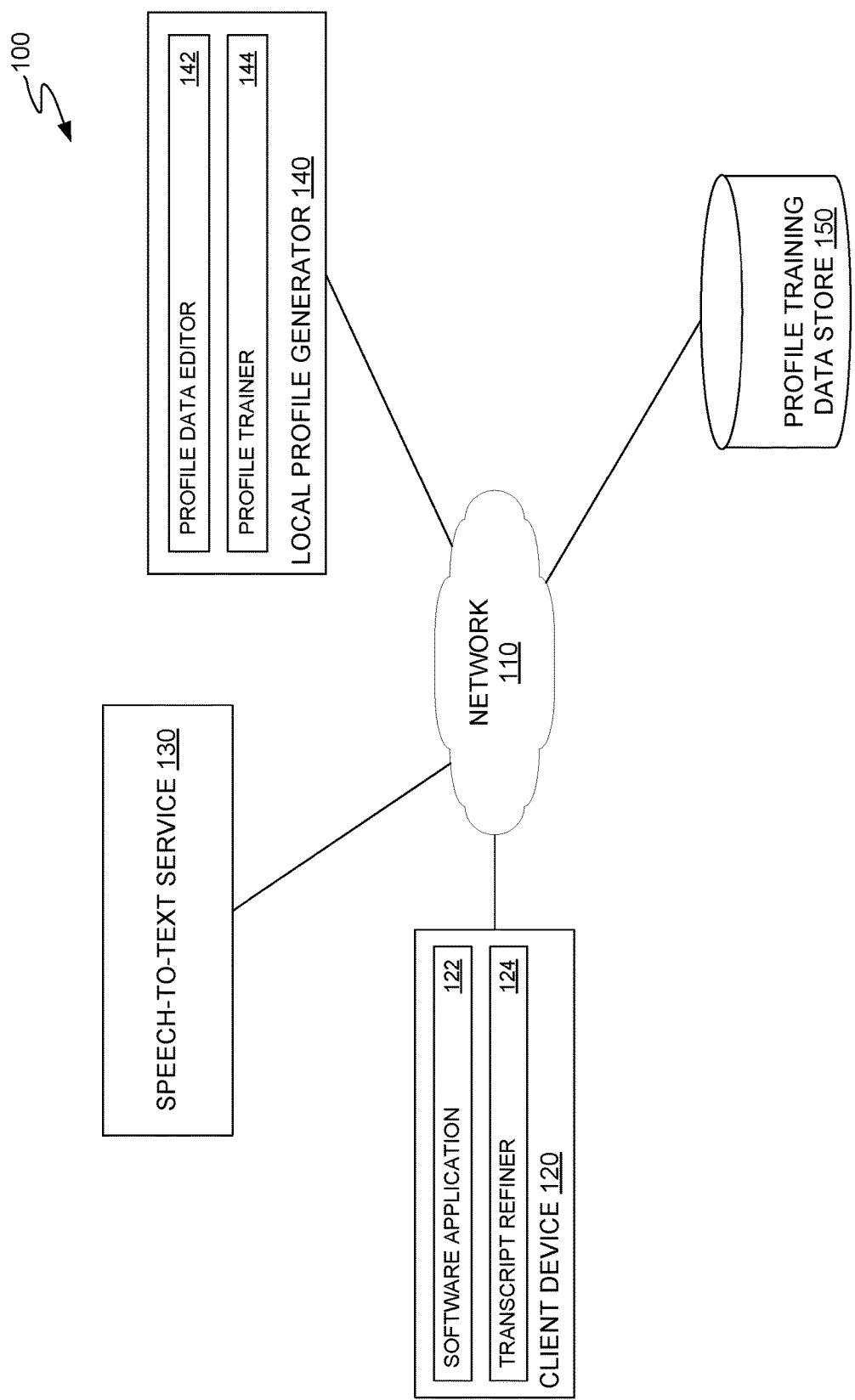
FIG. 1 illustrates an example networked environment in which local speech recognition profiles are created and maintained to augment output of a generally available speech-to-text system, according to one embodiment.

FIG. 1 illustrates an example networked computing environment in which local speech-to-text profiles augment generally-available speech-to-text systems for transcribing recordings of a user utterance into a text string, according to an embodiment of the present disclosure. As illustrated, computing environment 100 includes a client device 120, a speech-to-text service 130, a local profile generator 140, and a profile training data store 150, connected via network 110.

Client device 120 is generally representative of computing devices on which a user can invoke a function of a software application based on a received vocal command. Client device 120 may be, for example, a laptop computer, a desktop computer, a thin client, a tablet computer, a workstation, a mobile computing device, a gaming console, a smart assistant device, and the like. As illustrated, client device 120 includes a software application 122 and a transcript refiner 124.

Software application 122 generally provides an interface through which a user can invoke a speech transcription process on speech-to-text service 130 in order to perform a command in software application 122 or other applications executing on a client device 120. A user can invoke a speech transcription process on a speech-to-text service 130, for example, by saying a specific phrase into a microphone or other recording device connected to or integral with client device 120 or by interacting with one or more user interface elements (e.g., an icon displaying a microphone) that invokes an audio recording process on software application 122. After software application 122 records an utterance (e.g., records a command said by a user of software application 122), software application 122 can transmit the recording to speech-to-text service 130 for transcription. The recording may be, for example, an uncompressed audio file (e.g., a .WAV waveform) or a compressed audio file. In some embodiments, where the recording comprises a compressed audio file, an amount of compression may be set to reduce the size of the audio recording relative to the size of an uncompressed audio file while maintaining sufficient audio quality to allow for successful transcription of the recording by speech-to-text service 130.

Transcript refiner 124 may receive a text string from speech-to-text service 130 generated from the recorded utterance and use a local profile associated with the user to refine the text string. In some embodiments, transcript refiner 124 may select a local profile to use in analyzing and correcting the received text string by requesting user confirmation of the local profile to use. In some embodiments, transcript refiner 124 may attempt to match a voice included in the recorded utterance and background noise to identify a specific local profile to use (e.g., where a user has both a home and a work profile). In still further embodiments, transcript refiner 124 may use user history information in conjunction with voice matching techniques to identify a profile to use in analyzing and correcting the received text string. For example, where a user has multiple local profiles corresponding to different locations at which the user invokes a speech transcription operation using speech-to-text service 130 (e.g., home and work locations), transcript refiner 124 can examine timestamp information associated with the recorded utterance, device location information, and the like to determine whether to use the user's home local profile or work local profile to analyze and correct the received text string. The determination may be performed, for example, based on user history information indicating times at which a user is located at a specific location, which transcript refiner 124 may gather autonomously or based on user definitions.

The local profile selected by transcript refiner 124 to analyze and correct the text string received from speech-to-text service 130 may be trained by local profile generator 140 to recognize erroneous word transcription performed by speech-to-text service 130 for the user's specific accent or inflection. Generally, the local profile may include information mapping incorrectly transcribed words in the received text string to the correct word. Using the local profile, transcript refiner 124 may perform a word-by-word analysis of the received text string to identify words to be corrected in the received text string. Generally, words to be corrected in the received text string may be words having a mapping in the local profile, while words that need not be corrected in the received text string may be words that are not found in the local profile. For each incorrect word in the received text string (e.g., each word found in the local profile), transcript refiner 124 may replace the incorrect word with the corrected word mapped to the incorrect word in the local profile.

After transcript refiner 124 generates a corrected text string based on mappings between incorrectly transcribed words in the text string received from speech-to-text service 130 and corrected words learned from user feedback, transcript refiner 124 may output the corrected text string to a user of software application 122 for review. If the user confirms that the corrected text string is accurate (e.g., that transcript refiner 124 has identified incorrectly transcribed words in the text string received from speech-to-text service 130 and replaced the incorrectly transcribed words with the correct words), transcript refiner 124 may pass the corrected text string back to software application 122 to invoke a function or operation requested by the user of client device 120.

If, however, the user indicates that the corrected string is incorrect, transcript refiner 124 may request that the user identify incorrect words in the corrected string and provide corrections to the identified incorrect words. Transcript refiner 124 may pass the user-corrected string to software application 122 to invoke the function or operation requested by the user of client device 122. Further, transcript refiner 124 generally commits a record to profile training data store 150 (e.g., via local profile generator 140) including information identifying the user of client device 120, contextual information about the utterance recorded by software application 122 (e.g., an intent of the utterance, or the operation the user attempted to invoke through the utterance), the incorrectly parsed string received from speech-to-text service 130, and the user-corrected string. In some embodiments, transcript refiner 124 may cache user-corrected strings and the corresponding incorrectly parsed strings from speech-to-text service 130 for a batch commit to profile training data store 150 (e.g., through local profile generator 140) on a periodic basis. For example, transcript refiner 124 may commit records of user-corrected strings and the corresponding incorrectly parsed strings after a period of time elapses from a previous commit or after a threshold number of corrections have been made by a user of client device 120. In some embodiments, committing the record to profile training data store 150 may trigger a training process to update the local profile for the user and the context in which the user invokes the speech-to-text service.

Speech-to-text service 130 is generally representative of various generally available speech-to-text services that receive audio recordings of a user command or utterance and generates textual representations of the received audio recordings. Speech-to-text service 130 may be invoked by a client device 120 sending an audio recording to the speech-to-text service when a user says a predefined string of words or interacts with one or more user interface elements for invoking an operation in a software application 122.

Local profile generator 140 generally receives user-corrected text strings from client device 120, commits records correlating the user-corrected text strings to profile training data store 150, and re-trains a local profile for a user of client device 122 based on learned mappings between the user-corrected text strings and the incorrectly parsed text strings generated by speech-to-text service 130. As illustrated, local profile generator 140 includes a profile data editor 142 and a profile trainer 144.

Profile data editor 142 generally receives user information, context information, user-corrected text strings and the incorrectly parsed text strings generated by speech-to-text service 130 to update a record associated with the user in profile training data store 150 and used to generate a local profile for the user. In some embodiments, profile data editor 142 may create a record in profile training data store 150 when a user registers with local profile generator 140. To register with local profile generator 140, a user may provide information to profile data editor 142 identifying one or more probable linguistic characteristics of the user (e.g., gender, age, nationality, and other characteristics probative of a user's accent or inflection). In some embodiments, a user may further provide information to local profile generator 140 identifying a location at which a generated profile is to be used (e.g., when a user is at home, at work, in an indoor environment, in an outdoors environment, etc.). Based on the user-provided information identifying probable linguistic characteristics of a user, profile data editor 142 may generate a record in profile training data store including incorrect transcripts from speech-to-text service 130 and user-corrected strings corresponding to the incorrect transcripts retrieved from records associated with similar users (e.g., users who are the same gender and nationality and within the same age range as that of the user registering with local profile generator 140). Local profile generator 142 may provide the newly created record for the user to profile trainer 144 to generate a local profile based on the data obtained from similar users and provide the trained local profile to transcript refiner 124 at client device 120 for use in augmenting a generally available speech-to-text service 130, as discussed above. By initially generating a local profile based on profiles generated for similar users, profile data editor 142 may assume that similar users will have similar ways of pronouncing various words that may need to be corrected through the use of a local profile.

As discussed above, when a user determines that a text string corrected by transcript refiner 124 using a local profile includes inaccurately transcribed words, profile data editor 142 may receive the incorrectly parsed string generated by speech-to-text service 130 and the user-corrected string, along with user information identifying a profile to edit. Profile data editor 142 may add the incorrectly parsed string and the user-corrected string to the profile associated with the received user information, thus making the newly received information available for use by profile trainer 144 for use in training a local profile. In some embodiments, profile data editor may add the incorrectly parsed string and the user-corrected string to a set of incorrectly parsed strings and user-corrected strings, respectively, included in a single record for a particular user and context in which the user is using client device 120. In some embodiments, profile data editor may add a record to profile training data store associating a particular user (e.g., a user ID) with the incorrectly parsed string and the user-corrected string.

Profile trainer 144 generally uses information about the user, the incorrectly parsed strings, and the user-corrected strings to train a local profile for use by transcript refiner 142 in augmenting and correcting the text output generated by a generally available speech-to-text service 130. To train a local profile, profile trainer uses one or more classification models that maps user information, a conversation context (e.g., the requested action for which the received command was generated), and the incorrectly parsed strings to the corresponding user-corrected strings. The classification models generally cause a mapping to be learned between a tuple of (user information, conversation context, incorrectly parsed string from speech-to-text service 130) and the correctly parsed string such that when transcript refiner 124 encounters a matching or substantially matching tuple of (user information, conversation context, incorrectly parsed string from speech-to-text service 130), transcript refiner 124 can identify the words to replace in the incorrectly parsed string.

Profile trainer 144 may use supervised or unsupervised learning techniques to train a local profile for a user of client device 120 or update an existing local profile for the user of client device 120. If profile trainer 144 uses supervised learning techniques to generate or update the local profile, profile trainer may use the incorrect strings as features in an input vector and the corresponding user-corrected strings as the label data to learn mappings between the incorrect strings and the corresponding user-corrected strings. If profile trainer 144 uses unsupervised learning techniques to generate or update the local profile, profile trainer may input the data sets of the incorrect strings generated by speech-to-text system 130 and the user-corrected strings for profile trainer 144 to identify a mapping function between the incorrect strings and the user-corrected strings. Profile trainer 144 may use various machine learning models, such as clustering algorithms, neural networks, the bag of words model, word2vec or doc2vec models, or other appropriate machine learning models to identify mappings between incorrectly parsed strings generated by speech-to-text service 130 and the user-corrected strings provided by a user of client device 120.

Profile training data store 150 generally stores user profile information and other information that may be used to train one or more local profiles that augment the output of a generally available speech-to-text service 130 and correct for inaccurately parsed text output of the generally available speech-to-text service 130. Profile data store 150 may be, for example, a relational database in which records of conversation context, incorrectly parsed text output of a generally available speech-to-text service, and a user-corrected string are linked to a particular user profile. In another example, profile data store 150 may be a non-relational database or a flat file store in which user profile information, conversation contexts, incorrectly parsed text output of a generally available speech-to-text service, and user-corrected strings are stored.

Figure 2:
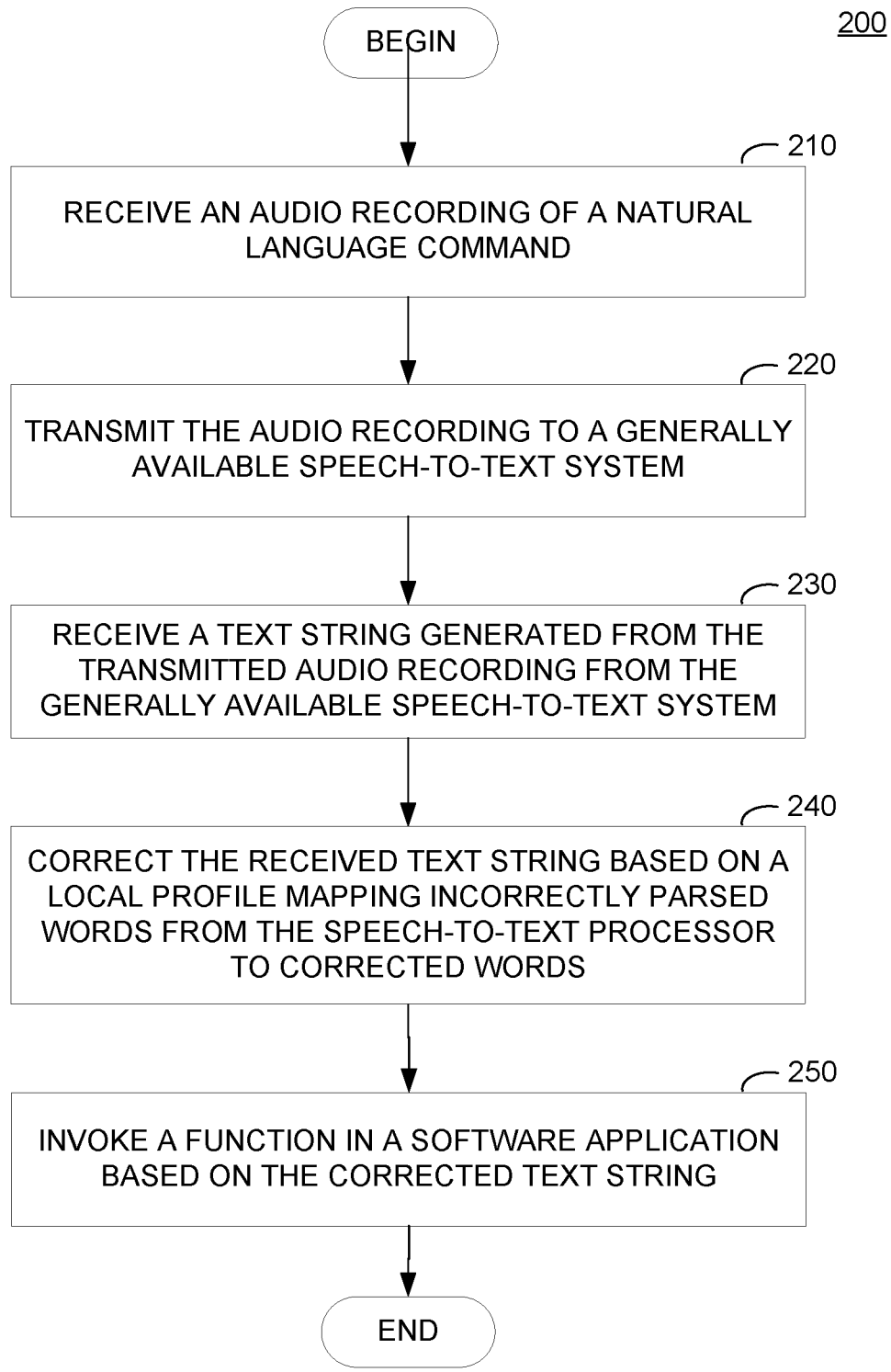
FIG. 2 illustrates example operations for converting speech to text using a generally available speech-to-text system and a local profile generated for a user of the speech-to-text system, according to one embodiment.

FIG. 2 illustrates example operations 200 for processing recordings of natural language commands using a generally available speech-to-text service augmented by a local profile for a user of the generally available speech-to-text service, according to an embodiment. As illustrated, operations 200 begin at block 210, where a system receives an audio recording of a natural language command. The audio recording may be received as an uncompressed or compressed audio file recorded in response to user action on a computing device to initiate audio recording operations, such as detecting that a user has said a pre-defined utterance or that a user has interacted with specific user interface elements in an application executing on the computing system.

At block 220, the system transmits the audio recording to a generally available speech-to-text system for transcription. At block 230, the system, in response to transmitting the audio recording to the generally available speech-to-text system, receives a text string generated from the transmitted audio recording. The text string, as discussed, may be generated by the generally available speech-to-text system using one or more speech transcription models trained on a general data set of native speakers of a particular language and thus may not accurately represent the command spoken by the user and included in the transmitted audio recording.

At block 240, the system corrects the received text string based on a local profile mapping incorrectly parsed words from the generally available speech-to-text professor to corrected words. As discussed, the local profile may be generated for a specific user and a specific environment in which the user interacts with the generally available speech-to-text service. Generally, the local profile may be trained to map incorrectly parsed words in a string representation of a natural language command received from a generally available speech-to-text service to words matching the user's intent based, at least in part, on previous corrections made to the text strings returned from the generally available speech-to-text service. In some embodiments, the local profile used by the system may be selected manually by a user of the system (e.g., when a user logs into or otherwise unlocks a computing device). In some embodiments, the local profile used by the system to correct the text string generated by the generally available speech-to-text system may be selected by the system based on one or more detected user characteristics and environmental characteristics. For example, in a multi-user system, the system can use voice matching techniques to identify the user of the system and the local profile(s) to use in correcting the text string received from the generally available speech-to-text system. Still further, where a user is associated with multiple profiles, environmental information may be used to select the appropriate profile to use in correcting the received text string, which may account for ambient noise and other acoustic characteristics (e.g., echoes) captured in a recording of a natural language command. For example, a system may use timestamp information and information correlating user location to particular timestamps to identify a profile to use in analyzing the received text string. In another example, a system may use geographic information, such as satellite positioning system (e.g., GPS, GALILEO, GLONASS, etc.) data, cell tower triangulation, or IP address location identification to identify where the system is located and thus which profile to use in correcting the text string received from the generally available speech-to-text system.

At block 250, the system invokes a function in a software application based on the corrected text string. In some embodiments, the function may be invoked locally (e.g., on the system) to perform a function in an application executing on the system. In some embodiments, the function may be invoked on a remote system by transmitting a message from the system to a remote server hosting an application. The function may be invoked on a remote system, for example, to retrieve information from a remote system or to modify information stored remotely that an application executing on a system is using.

Figure 3:
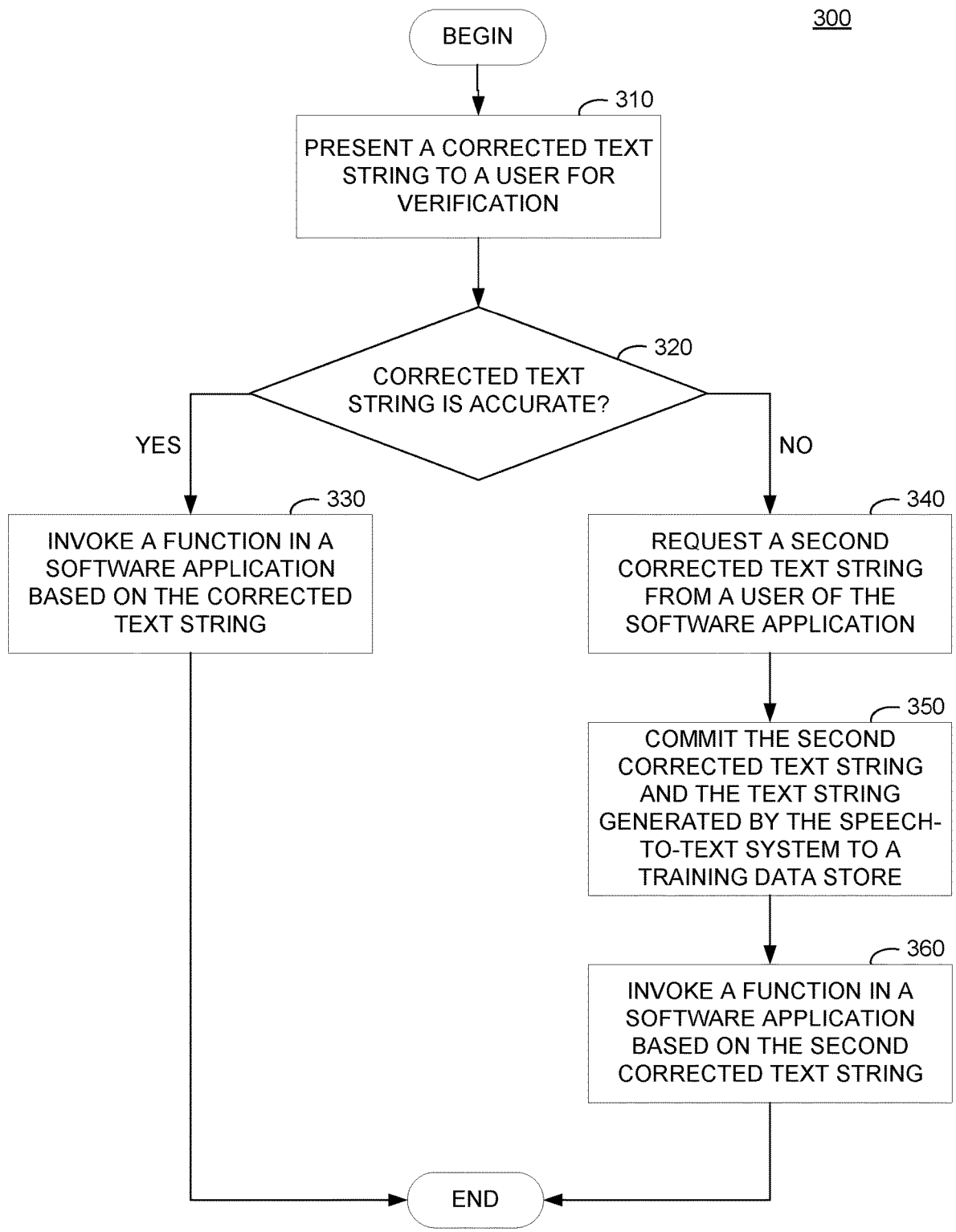
FIG. 3 illustrates example operations for generating a local profile for augmenting a generally available speech-to-text system, according to one embodiment.

FIG. 3 illustrates example operations 300 that may be performed by a system to correct a text string received from a generally available speech-to-text service and train a local profile to correct text strings received from a generally available speech-to-text service, according to an embodiment of the present disclosure. As illustrated, operations 300 begin at block 310, where a system presents a corrected text string to a user of a software application executing on the system for verification. The system may determine whether to present the corrected text string to the user of the software application based on whether the system used the local profile to correct the text string received from the generally available speech-to-text service, a number of corrections made to the text string received from the generally available speech-to-text service, a confidence level associated with corrections to the text string received from the generally available speech-to-text service, or the like. For example, if the system determined that no corrections were needed, the system need not present the text string to the user. If, however, corrections were needed based on mappings between incorrectly transcribed words in the received text string and corrected words in the local profile, the system may present the corrected text string to the user or perform further analyses to determine whether to present the corrected text string to the user.

At block 320, the system determines whether the corrected text string is accurate. The system may determine that the corrected text string is an accurate representation of the command issued by a user if the user answers in the affirmative. If so, operations 300 may proceed to block 330, where the system invokes a function in a software application based on the corrected text string.

If, however, at block 320, the system determines that the corrected text string is an inaccurate representation of the command issued by a user (e.g., if the user responds to the prompt generated at block 310 in the negative), the system may determine that further corrections to the corrected text string and updates to the local profile are needed. Operations 300 may proceed to block 340, where the system requests a second corrected text string from the user of the software application. In some embodiments, the system may request the second corrected text string from the user of the software application by requesting that the user identify incorrectly parsed words in the corrected text string. A user may identify incorrectly parsed words in the corrected text string, for example, by clicking on or selecting specific words in the corrected text string, clicking on checkboxes or other user interface elements associated with each word in the corrected text string, typing the second corrected text string, or the like. Where a user identifies incorrectly parsed words by clicking on selecting words in the corrected text string or user interface elements associated with specific words in the corrected text string, the system can present a prompt to a user to allow the user to input the correct word into the system. If the user types a second corrected text string into the system, the system can identify words to be corrected based on position mappings between words in the corrected text string and the second corrected text string.

At block 350, the system commits the second corrected text string and the text string generated by the speech-to-text system to a training data store. To commit the second corrected text string and the text string generated by the speech-to-text system to the training data store, the system can generate a record in the training data store associating the user, a context in which the user generated the command, and the text string generated by the generally accessible speech-to-text service with the second corrected text string. The record may be generates as a discrete record in a database or added to a single record containing each of the corrections made for a particular user profile (e.g., user and location in which the user is using a speech-to-text system).

In some embodiments, committing the second corrected text string and the text string generated by the speech-to-text system to the training data store may trigger a re-training process for the local profile. As discussed above, re-training the local profile generally allows for subsequent invocation of the speech-to-text system to use additional corrections to text strings to increase the accuracy of the speech-to-text system. To re-train the local profile, the system can request that a remote training system obtain records associated with the user profile (e.g., records associated with a particular user and a location at which the user is using the speech-to-text system), including the record committed to the training data store at block 350, and generate a new local profile for the system to subsequently use in correcting the output of a generally available speech-to-text system for recordings of similar natural language commands.

At block 360, the system invokes a function in the software application based on the second corrected text string. By invoking a function in the software application based on the second corrected text string, the system can invoke the correct function in the software application using the correct, user-verified parameters rather than incorrect parameters derived from an incorrectly generated and corrected text string.

Figure 4:
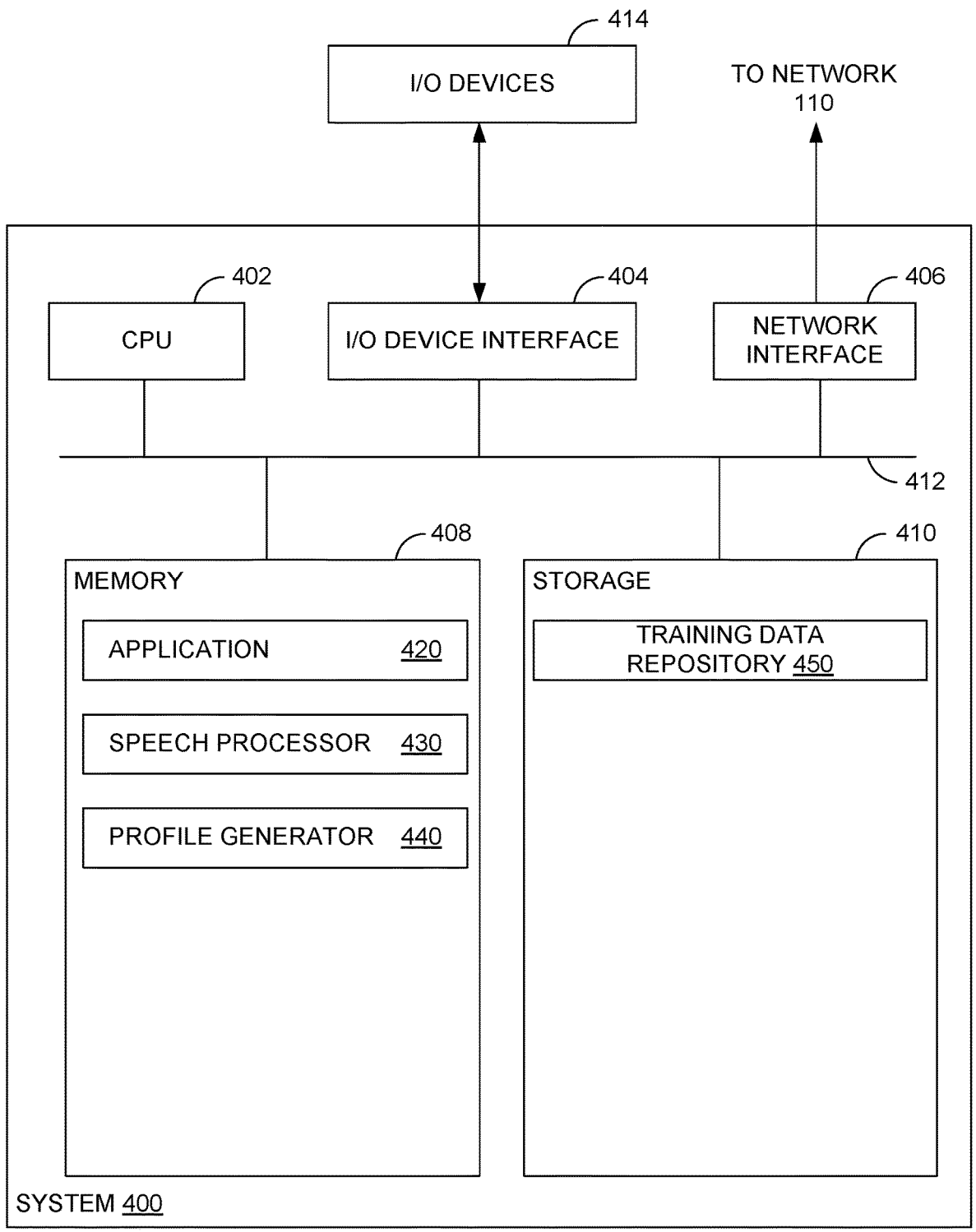
FIG. 4 illustrates an example system in which aspects of the present disclosure may be performed.

FIG. 4 illustrates an example system 400 that uses local profiles to augment and correct the output of a generally available speech-to-text system, according to an embodiment. As shown, distributed deep learning system 400 includes, without limitation, a central processing unit 402, one or more I/O device interfaces 404, which may allow for the connection of various I/O devices 414 (e.g., keyboards, displays, mouse devices, pen input, etc.) to the entity analytics system 400, network interface 406, a memory 408, storage 410, and an interconnect 412.

CPU 402 may retrieve and execute programming instructions stored in the memory 408. Similarly, the CPU 402 may retrieve and store application residing in the memory 408. The interconnect 412 transmits programming instructions and application data among the CPU 402, I/O device interface 404, network interface 406, memory 408, and storage 410. CPU 402 is included to be representative of a single CPU, multiple CPUs, a single CPU having multiple processing cores, and the like. Additionally, the memory 408 is included to be representative of a random access memory. Furthermore, storage 410 may be a disk drive. Although shown as a single unit, the storage 410 may be a combination of fixed and/or removable storage devices, such as fixed disc drives, solid state drives, removable memory cards or optical storage, network attached storage (NAS), or a storage area network (SAN).

As illustrated, memory 408 includes an application 420, speech processor 430, and profile generator 440. Application 420 generally represents a variety of applications through which a user can invoke audio recording functions on system 400 to record a user utterance of a natural language command. When application 420 records a user utterance of a natural language command, application 420 can transmit the recording to a generally accessible speech-to-text service (e.g., speech-to-text service 130 illustrated in FIG. 1) for initial analysis.

Speech processor 430 generally receives a text string from the generally accessible speech-to-text service and uses a local profile to correct the received text string. Speech processor 430 uses contextual information associated with the user of system 400 to identify a profile to use in correcting the received text string. For example, speech processor 430 can use vocal matching techniques to identify a specific user of system 400 and the profile associated with the specific user. Speech processor 430 can further us other information, such as time and location information, to identify a specific environment in which system 400 is being used and identify a specific user profile to use in correcting the received text string. Using the local profile, speech processor 430 can correct the text string received from the generally accessible speech-to-text system based on mappings between incorrectly transcribed words in the received text string to user-provided corrections to the incorrectly transcribed words. Speech processor 430 further provides an interface through which system 400 requests user confirmation that a corrected text string is accurate or, if the corrected text string is inaccurate, receives corrected text strings to use in re-training the local profile used to generate the corrected text string. Based on the corrected text string and, in some cases, user-provided information, speech processor 430 can invoke a function in application 420 and/or an application executing on a remote server.

Profile generator 440 uses records of user information, command context, text string generated by a generally accessible speech-to-text system, and the corrected text string to train a local profile for augmenting and correcting the output of a generally accessible speech-to-text system. As discussed above, profile generator 440 may be invoked when a new user registers on system 400, when a user provides corrected information into the system in response to an incorrectly parsed string, and/or periodically. Profile generator 440 can use unsupervised, semi-supervised, or supervised learning techniques to identify a mapping function to map user information, context, and text string generated by a generally available speech-to-text system to a user-corrected string.

Storage 410, as illustrated, includes a training data repository 450. Training data repository 450 is generally representative of a repository in which training data sets associated with different user profiles are stored. Training data repository 450 may be a structured or unstructured data store in which information about incorrectly transcribed text strings are associated with user corrections to those text strings. As discussed above, the data stored in training data repository 450 may be used to generate a local profile that corrects the output of a generally available speech-to-text service in order to account for specific user speech characteristics that may not be corrected for by a generally available speech-to-text service.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specifically described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer-readable storage medium (or media) having computer readable program instructions thereon for causing a processor to carry out aspects of the present invention.

The computer-readable storage medium can be a physical device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for invoking an action on a computing device using natural language commands, comprising:
generating a local profile by mapping one or more features associated with a user of the computing device to a data set of conversation context for a previous audio recording of a user of the computing device, a voice transcript generated by the speech-to-text system for the previous audio recording, and a corrected textual representation of the previous audio recording;
training a machine learning model based on the mapping of one or more features associated with the user of the computing device to the data set, wherein the mapping of incorrectly parsed words to corrected words comprises a mapping of an identified corrected utterance to incorrectly parsed words in the text string for the received natural language command based on the one or more features associated with the user of the computing device and a conversational context associated with the received natural language command;
receiving an audio recording of a natural language command;
transmitting, to a speech-to-text system, the received audio recording;
receiving, from the speech-to-text system, a text string generated from the received audio recording;
correcting the text string based on the trained machine learning model; and
invoking a function in a software application based on the corrected text string.

2. The method of claim 1, further comprising:
generating the local profile based on a default local profile associated with one or more features associated with a user of the computing device.

3. The method of claim 2, wherein the one or more features associated with the user of the computing device comprises features indicative of a probable inflection with which the user of the computing device speaks.

4. The method of claim 1, further comprising:
outputting the corrected text string for user evaluation; and
receiving a second corrected text string, wherein the function is invoked using the second corrected text string rather than the corrected text string.

5. The method of claim 4, further comprising:
upon receiving the second corrected text string, adding the text string generated from the received natural language command and the second corrected text string to a data set used to train a machine learning model to identify corrected utterances for the received natural language command based on one or more features associated with a user of a computing device.

6. The method of claim 5, wherein the machine learning model comprises a classifier trained using unsupervised learning techniques.

7. The method of claim 5, further comprising:
invoking a training process for a local profile associated with the user of the computing device to update the local profile associated with the user; and
transmitting the updated local profile to the computing device.

8. A system, comprising:
a processor; and
a memory having instructions stored thereon which, when executed by the processor, perform an operation for invoking an action on a computing device using natural language commands, the operation comprising:
generating a local profile by mapping one or more features associated with a user of the computing device to a data set of conversation context for a previous audio recording of a user of the computing device, a voice transcript generated by the speech-to-text system for the previous audio recording, and a corrected textual representation of the previous audio recording;
training a machine learning model based on the mapping of one or more features associated with the user of the computing device to the data set, wherein the mapping of incorrectly parsed words to corrected words comprises a mapping of an identified corrected utterance to incorrectly parsed words in the text string for the received natural language command based on the one or more features associated with the user of the computing device and a conversational context associated with the received natural language command;
receiving an audio recording of a natural language command;
transmitting, to a speech-to-text system, the received audio recording;
receiving, from the speech-to-text system, a text string generated from the received audio recording;
correcting the text string based on the trained machine learning model; and invoking a function in a software application based on the corrected text string.

9. The system of claim 8, wherein the operation further comprises:
generating the local profile based on a default local profile associated with one or more features associated with a user of the computing device.

10. The system of claim 9, wherein the one or more features associated with the user of the computing device comprises features indicative of a probable inflection with which the user of the computing device speaks.

11. The system of claim 8, wherein the operation further comprises:
outputting the corrected text string for user evaluation; and
receiving a second corrected text string, wherein the function is invoked using the second corrected text string rather than the corrected text string.

12. The system of claim 11, wherein the operation further comprises:
upon receiving the second corrected text string, adding the text string generated from the received natural language command and the second corrected text string to a data set used to train a machine learning model to identify corrected utterances for the received natural language command based on one or more features associated with a user of a computing device.

13. The system of claim 12, wherein the machine learning model comprises a classifier trained using unsupervised learning techniques.

14. The system of claim 12, wherein the operation further comprises:
invoking a training process for a local profile associated with the user of the computing device to update the local profile associated with the user; and
transmitting the updated local profile to the computing device.

15. A non-transitory computer-readable medium having instructions stored thereon which, when executed by one or more processors, performs an operation for invoking an action on a computing device using natural language commands, the operation comprising:
generating a local profile by mapping one or more features associated with a user of the computing device to a data set of conversation context for a previous audio recording of a user of the computing device, a voice transcript generated by the speech-to-text system for the previous audio recording, and a corrected textual representation of the previous audio recording;
training a machine learning model based on the mapping of one or more features associated with the user of the computing device to the data set, wherein the mapping of incorrectly parsed words to corrected words comprises a mapping of an identified corrected utterance to incorrectly parsed words in the text string for the received natural language command based on the one or more features associated with the user of the computing device and a conversational context associated with the received natural language command;
receiving an audio recording of a natural language command;
transmitting, to a speech-to-text system, the received audio recording;
receiving, from the speech-to-text system, a text string generated from the received audio recording;
correcting the text string based on the trained machine learning model; and
invoking a function in a software application based on the corrected text string.

16. The non-transitory computer-readable medium of claim 15, wherein the operation further comprises:
generating the local profile based on a default local profile associated with one or more features associated with a user of the computing device.

17. The non-transitory computer-readable medium of claim 16, wherein the one or more features associated with the user of the computing device comprises features indicative of a probable inflection with which the user of the computing device speaks.

18. The non-transitory computer-readable medium of claim 15, wherein the operation further comprises:
outputting the corrected text string for user evaluation;
receiving a second corrected text string, wherein the function is invoked using the second corrected text string rather than the corrected text string; and
upon receiving the second corrected text string, adding the text string generated from the received natural language command and the second corrected text string to a data set used to train a machine learning model to identify corrected utterances for the received natural language command based on one or more features associated with a user of a computing device.

19. The non-transitory computer-readable medium of claim 18, wherein the machine learning model comprises a classifier trained using unsupervised learning techniques.

20. The non-transitory computer-readable medium of claim 18, wherein the operation further comprises:
invoking a training process for a local profile associated with the user of the computing device to update the local profile associated with the user; and
transmitting the updated local profile to the computing device.

* * * * *